(12) United States Patent
Womack et al.

(10) Patent No.: US 10,713,497 B2
(45) Date of Patent: Jul. 14, 2020

(54) SYSTEMS AND METHODS FOR SUPPLEMENTING CAPTURED DATA

(71) Applicant: Axon Enterprise, Inc., Scottsdale, AZ (US)

(72) Inventors: Marcus William Lee Womack, Redmond, WA (US); James Norton Reitz, Brainbridge, WA (US); Nache D. Shekarri, Cave Creek, AZ (US); Daniel J. Wagner, Scottsdale, AZ (US); Mark A. Hanchett, Mesa, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 166 days.

(21) Appl. No.: 15/796,229

(22) Filed: Oct. 27, 2017

(65) Prior Publication Data

US 2018/0121738 A1 May 3, 2018

Related U.S. Application Data

(60) Provisional application No. 62/414,446, filed on Oct. 28, 2016.

(51) Int. Cl.
*G06K 9/00* (2006.01)
*G06K 9/62* (2006.01)
(Continued)

(52) U.S. Cl.
CPC .......... *G06K 9/00771* (2013.01); *B43L 1/002* (2013.01); *B43L 1/12* (2013.01);
(Continued)

(58) Field of Classification Search
CPC ............. G06K 9/00718; G06K 9/3241; G06K 9/00234; G06K 9/6202; G06K 9/00744; G06K 9/2063
See application file for complete search history.

(56) References Cited

U.S. PATENT DOCUMENTS 9,083,850 B1* 7/2015 Higgs .................... H04N 7/147
9,323,347 B2* 4/2016 Liang .................... G06F 3/0304
(Continued)

FOREIGN PATENT DOCUMENTS

EP 2819108 A1 12/2014

OTHER PUBLICATIONS

International Searching Authority, International Search Report and Written Opinion for the International Patent Application No. PCT/US2017/058790 dated Feb. 26, 2018.
(Continued)

*Primary Examiner* — Solomon G Bezuayehu
(74) *Attorney, Agent, or Firm* — Justin K. Powley; Lawrence Letham

(57) ABSTRACT

An evidence ecosystem that includes a capture system that detects physical properties in the environment around the capture system and captures data related to the physical properties. The capture system analyzes the captured data in accordance with patterns to detect characteristics and patterns in the captured data. Upon detecting a characteristic or a pattern, the capture system records the identified data and alignment data that identifies the location of the identified data in the captured data. The capture system sends the captured data, identified data, and alignment data to an evidence management system for use in generating reports and producing redacted copies of the captured data for distribution or presentation.

20 Claims, 4 Drawing Sheets

(51) Int. Cl.
  *G06K 9/20*     (2006.01)
  *G06K 9/32*     (2006.01)
  *B43L 1/00*     (2006.01)
  *B43L 1/12*     (2006.01)
  *G03B 21/62*    (2014.01)
  *G03B 21/56*    (2006.01)
  *G03B 21/58*    (2014.01)
  *G03B 21/60*    (2014.01)
  *G03B 21/625*   (2014.01)

(52) U.S. Cl.
  CPC ......... *G03B 21/62* (2013.01); *G06K 9/00234* (2013.01); *G06K 9/00718* (2013.01); *G06K 9/00744* (2013.01); *G06K 9/2063* (2013.01); *G06K 9/3241* (2013.01); *G06K 9/6202* (2013.01); *G03B 21/56* (2013.01); *G03B 21/58* (2013.01); *G03B 21/60* (2013.01); *G03B 21/625* (2013.01)

(56) References Cited

U.S. PATENT DOCUMENTS

| | | | | |
|---|---|---|---|---|
| 10,015,546 | B1* | 7/2018 | Petty | H04N 21/6543 |
| 10,091,178 | B2* | 10/2018 | Phirmis | G06F 21/10 |
| 2004/0003042 | A1 | 1/2004 | Horvitz et al. | |
| 2011/0280442 | A1* | 11/2011 | Chen | G06K 9/00778 |
| | | | | 382/103 |
| 2012/0150537 | A1* | 6/2012 | Abe | G06F 21/60 |
| | | | | 704/235 |
| 2013/0004090 | A1 | 1/2013 | Kundu et al. | |
| 2013/0027554 | A1 | 1/2013 | Meadow | |
| 2013/0108105 | A1 | 5/2013 | Yoo et al. | |
| 2013/0129142 | A1 | 5/2013 | Miranda-Steiner | |
| 2013/0212507 | A1 | 8/2013 | Fedoseyeva et al. | |
| 2015/0194151 | A1* | 7/2015 | Jeyachandran | G10L 15/20 |
| | | | | 704/233 |
| 2016/0118058 | A1 | 4/2016 | Birkle | |
| 2016/0140395 | A1* | 5/2016 | Kumar | G06K 9/00664 |
| | | | | 382/103 |
| 2016/0205381 | A1 | 7/2016 | Macmillan et al. | |
| 2016/0246996 | A1* | 8/2016 | Khoo | G06F 16/00 |
| 2018/0107830 | A1* | 4/2018 | Bobbitt | G06F 21/6209 |

OTHER PUBLICATIONS

Ribaric, Slobodan, et al., "De-Identification for Privacy Protection in Multimedia Content: A Survey", Signal Processing, Image Communication, Elsevier Science Publishers, Amsterdam NL, vol. 47, Jun. 1, 2016, pp. 131-151.

European Patent Office, Extended European Search Report for European Patent Application No. 17865611 dated May 26, 2020.

* cited by examiner

SYSTEMS AND METHODS FOR SUPPLEMENTING CAPTURED DATA

FIELD OF THE INVENTION

Embodiments of the present invention relate to processing captured data.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

Figure 1:
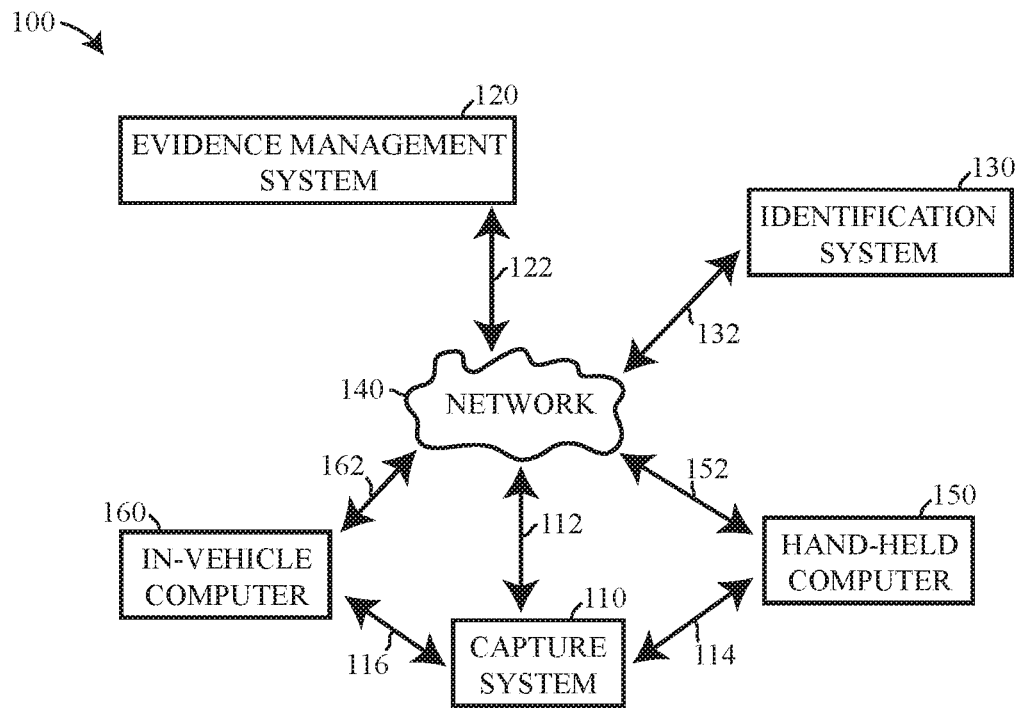
FIG. 1 is a functional block diagram an ecosystem for evidence according to various aspects of the present invention.

An ecosystem for evidence (e.g., evidence ecosystem) is a group of systems that cooperate with each other to collect, manage, identify, categorize, and/or process evidence. An evidence ecosystem may include systems that capture data for evidence, store captured data, analyze captured data, and prepare the captured data to be provided as evidence to the public or in a proceeding.

A capture system, such as a camera, a microphone, a heat detector, a radiation detector, a biological monitor, an infrared detector, or any other type of detector may detect physical properties of its environment and capture (e.g., record, save, store) data (e.g., information) regarding the physical properties and/or the environment. Data that is detected and stored may be referred to as captured data.

A capture system capable of analyzing the captured data at or near the time of capture and before upload to a computer system may decrease the amount of time and processing power required by the computer system to analyze and/or operate on the data. Further, a capture system capable of analyzing captured data may be able to provide timely reports to the user and/or associates regarding the captured data.

Captured data may be analyzed to detect patterns. Analyzing data for patterns may identify objects, patterns, occurrences, trends, information, maximum values, minimum values, and average values in the captured data. Analyzing data to find patterns my make the captured data more useful when using the captured data as evidence. Captured data may be converted to any form to aid analysis. Captured data may be converted and/or stored as digital data to permit analysis using a computer.

Analysis of captured data may result in portions of the captured data being identified as matching a pattern, identifying a trend, providing specific information, and/or having a particular value (e.g., max, min, average). Portions of the captured data that match a pattern, a trend, information, and/or a value may be referred to as identified data or an identified object.

A record that identified data was found in the captured data may be created. The record of identified data may include information as to the type of analysis (e.g., semantic, visual, audio) performed, to identify the data, a copy of the identified data from the captured data, and a description of the identified data as discussed below. As further discussed below, a record of identified data may include alignment data or a link to alignment data for the identified data.

A record may be created for each identified data identified (e.g., found, discovered) in the captured data.

Analysis of captured data may result in a description of the identified data or object. A description of identified data may include a description of the nature of the identified data.

For example, one or more patterns used to identify data that appears in captured data may include a pattern for a firearm. Finding the pattern for the firearm in the captured data provides information to describe the identified data as a firearm. The pattern may be specific to a specific firearm so that the description of the identified data may include more information other than the identified data is a firearm. The identified data may further include the manufacture and model number of the firearm. Patterns for other types of objects may provide information that describes the identified data.

A description of identified data may include information such as the maximum (e.g., highest) temperature in an infrared scan, or a gradient of the temperature change from the lowest temperature in the infrared scan to the identified highest temperature.

Analysis of captured data may generate information regarding the captured data. For example, analysis may determine the name of the person, whether provided by the person, determined through facial recognition, or extracted from documents (e.g., drivers license) provided by the person. The analysis may also provide information regarding the race of the person identified, gender, age, hair color, eye color, and a mathematical description of the person's facial geometries (e.g., eye size, eye shape, eye spacing, nose shape, nose length, spacing from nose to eyes, spacing from cheeks to chin). The information that results from analysis of the captured data may be stored as part of the description of the data identified during analysis. Descriptive information may be stored in the record of the identified data as discussed herein.

A description of identified data may identify the data as being or as being related to the types of information identified in Tables 1-3.

The record of the identified data may include a description of the identified data.

Analysis of captured data may further include information as to how the identified data or object relates to the captured data. Identified data may related to the captured data, for example, in time and/or space. The information as to how the identified data relates to the captured data may be referred to as alignment data. Alignment refers to aligning the identified data in space and/or time to the location in the captured data where the identified data appears (e.g., occurs, is found) in the captured data.

Alignment data may be stored in the record of the identified data. Alignment data may be stored in a separate alignment record and linked to the record of the alignment data. Each record of identified data may be associated to a record of alignment data.

Alignment data may identify where the identified data first appears in the captured data, where the identified data last appears in the captured data, and all locations where the identified data appears between the first and last appearances. For example, alignment data may identify when a person begins to utter (e.g., speak) a phrase and when they stop speaking the phrase. Alignment data may identify the first frame when a person's face first appears in captured data and the last frame where the face appears.

For example, the identified data may be a person's face. Alignment data indicates (e.g., points to) the location in the captured data where the identified face appears. Alignment data may take any form suitable to describe the location of the identified data with respect to the captured data.

Alignment data may identify the time in the captured video when the identified data occurs. For example, alignment data may identify a frame where the identified data was found. Alignment data may include an elapsed time from a start of the captured data to the location of identified data. Alignment data may include a start time and an end time relative to the captured data for the time when the identified data first appears in the captured data and the time when the identified data disappears from the captured data.

A video data may show a visual image (e.g., picture). The visual image may include the identified data plus other data. Alignment data may identify the location (e.g., portion, part) of the visual image where the identified data appears. For example, visual data may be captured and recorded as frames of data. The area of a frame where the identified data appears may be identified with respect to a Cartesian grid, pixel numbers, or using any other conventional technique for identifying a portion of an image, individual pixels of an image, or a group of pixels. Alignment data may include information to identify the portion of the visual data where the identified data is located.

For example, analysis of a stream of video data may identify a time (e.g., absolute, elapsed, frame number) where the analysis detected a weapon in the video data. Analysis may identify a person brandished a weapon starting in frame 384 of the captured video. The analysis may further report the location of the weapon in each frame, such as frame 384: upper left corner, frame 385: just below upper left corner, and so forth. Each pixel of a frame of captured video data may be numbered (e.g., x, y) to facilitate accurate identification of the location of the identified data. More than one number pair may be used to identify the location of the identified data in the grid.

Audio data from a microphone may be captured and analyzed for physical properties (e.g., features, traits, volume, frequency, pattern). A record may be created for identified audio data. The alignment data that relates the identified audio data to the captured data may include a time from the start of the recording (e.g., elapsed time), a time from the end of the recording (e.g., remaining time), a time of day (e.g., absolute time), a frequency band where the identified data lies (e.g., frequency alignment), and/or a frame number of associated video data.

Captured data from a radiation detector may be analyzed and any identified data related to the captured data by elapsed time, remaining time, and/or the intensity band of the radiation.

Alignment data may include any coordinate system, whether linear, two-dimensional, or three dimensional, that is capable of describing the location of identified data in the captured data. The granularity of the resolution the coordinate system that defines the location of the identified data may be suited for the type of data (e.g., video, audio, infrared, radiation) and sufficient to find the identified data in the captured data. Alignment data may identify a single point in the captured data, an area of the captured data, and/or all portions of the captured data that correspond to the identified data. The examples provided above of time, space (e.g., location in frame), frequency (e.g., frequency band), or intensity (e.g., radiation intensity) are non-limiting examples.

Any system in the evidence ecosystem may analyze the captured data to produce (e.g., generate, determine) identified data and/or alignment data. Just as captured data may be stored, records of identified data and alignment data may also be stored. Records of identified data and alignment data may be stored separately from and/or with the captured data analyzed to produce the record of identified data and/or the alignment data.

In the event that records of identified data is voluminous or the identified data from disparate or many locations is summarized or analyzed, identified data may include a summary and/or a result of analysis (e.g., average value, velocity of an object tracked in many frames, luminosity) and the alignment data may describe the portions of the captured data analyzed to produce the summary and/or analysis result.

Records of identified data and/or alignment data may be generated and/or stored in any form. Records of identified data and/or alignment data may include digital numerical data (e.g., integer, floating point), digital alpha-numeric data (e.g., ASCII), or any other type of digital data suitable for storing in a memory system.

As used herein, metadata is data that describes other data. Captured data may include non-textual data such as video data, audio data, or data form some other type of capture system. A record of identified data may include non-textual data, for example a copy of the captured data. However, since the identified data is a portion of the captured data, it may be referred to as metadata. A description of identified data is a description of a portion of the captured data and may be referred to as metadata. In the case where identified data is a summary or a result of analysis, the summary or result describes the captured data and may be referred to as metadata. Alignment data describes a relationship between captured data and identified data and may also be referred to as metadata.

Records of identified data and/or alignment data may be used to prepare captured data to be used as evidence. Records of captured data and/or alignment data may increase the efficiency of the computer handling captured data because the records of the identified data and the alignment data provide information to enable more efficient redaction (e.g., editing, amendment) of captured data and report generation regarding captured data.

Captured data may be used as evidence by providing a report regarding the captured data or by making a copy of the captured data for public release. Captured data that is to be released publicly may be redacted prior to release. Records of identified data and alignment data facilitate making reports and redacting captured data thereby reducing the computational load or requirements of the computer making the report or preparing the captured date for public release.

A report may use identified data to provide information on what (e.g., objects, occurrences, trends, information, maximum values, minimum values, average values) was identified in the captured data. A report may describe objects and/or events identified in the captured data. A report may use alignment data to identify the locations of the objects or events determined by analysis of the captured data. A report as to the location of objects or events in captured data may make review of captured data more efficient. A report may provide information as to the number and type of incidents recorded by all devices in the ecosystem including multiple capture systems. A report may report the duration of an incident.

Records of identified data and/or alignment data may be used to redact sensitive, private, or nonessential data from captured data, or a copy thereof, prior to public release or presentation. Records of identified data may be used to determine whether a portion of the captured data qualifies for redaction. If identified data qualifies for redaction, alignment data identifies the location in the captured data that should be redacted.

An evidence management system is a computer system (e.g., server) that receives data from one or more capture systems. An evidence management system receives captured data from capture systems and stores the captured data in such a manner that it may be used as evidence in a proceeding, such as a legal proceeding. An evidence management system may organize data according to the capture system that captured the data. An evidence management system may further organize and store captured data according to agencies (e.g., groups, organizations). An agency may employ capture systems to capture data. An evidence management system may group captured data for storage according to the agency to which the person using the capture system is employed.

Because an evidence management system may receive and store captured data from many capture systems, an evidence management system is in a good position to produce reports and to provide redacted copies of captured data for public release or for presentation.

An evidence management system may provide a copy of captured data for use as evidence. An evidence management system may remove (e.g., redact) some data from the copy of the captured data prior to releasing the copy. An evidence management system may assess captured data, records of identified data, and/or alignment data and provide a report of the content.

Before data can be analyzed for reporting or redacting, it must first be captured. A capture system captures data. A capture system may capture and transmit data to an evidence management system in such a manner as to preserve the value of the data as evidence. An example of a captures system is video camera worn on the body of a police officer or mounted in a police vehicle. The camera captures audio/visual data, sends the captured data to an evidence management system where the captured data is used as evidence of an incident or an event.

A capture system includes any type of system that includes a detector that detects physical properties in the environment (e.g., surroundings) of the captures system and that captures data related to detecting. Capture system 110 is discussed more fully below.

Any system of an evidence ecosystem 100 may analyze captured data. The discussion of evidence ecosystem 100 of FIG. 1 below, discloses that capture system 110 may detect, capture, and store the captured data and that evidence management system 120 may receive and store the captured data to subsequently provide reports and copies of captured data. However, the below description further discloses that capture system 110, evidence management system 120, and/or identification system 130 may analyze captured data to produce records of identified data and/or alignment data. Analysis of captured data may be performed by any system that has the sufficient computing power and memory to perform the analysis and store the records of identified data and/or alignment data. Thus in-vehicle computer 160 and hand-held computer 150 may also analyze captured data, but below only capture system 110, evidence management system 120, and identification system 130 are discussed as performing analysis.

An evidence management system may perform analysis of the captured data. An evidence management system may provide captured data to another system (e.g., identification system) so the other system may analyze or further analyze the captured data. An evidence management system may analyze captured data from one or more capture systems to produce reports, find information in common between the capture systems, identify objects in the captured data, identify patterns in the captured data, identify trends in captured data, identify types of data, align the captured data from two or more systems so that events or objects identified in the different captured data are aligned by occurrence of an event, and/or redact identified data from the captured data.

An evidence management system may receive and/or store captured data, records of identified data, and/or alignment data from a capture system or any other system in an evidence ecosystem.

An identification system may analyze captured data to detect objects, patterns, occurrences, trends, information, maximum values, minimum values, and average values. An identification system may receive captured data from any system of an evidence ecosystem and provide a result of the analysis to any system of the ecosystem. An identification system may identify the system that provides the captured data using a unique identifier. An identification system may receive information as to the type of sensors that collected the captured data. An identification system may perform analysis consistent with the type of sensor that detected the captured data. An identification system may receive captured data and a request to perform a particular type of analysis.

An identification system may have access to information not available to an evidence management system or a capture system such as a fingerprint database, a database of people's facial features, a motor vehicle database, and a criminal records database. Whether an evidence management system or a capture system analyzes captured data, the identified data found by analysis may be provided to an identification system to perform further analysis or matching that cannot be performed by the evidence management system and/or the capture system.

An identification system may receive captured data, analyze the data, and provide a report of the analysis back to the evidence management system. An identification system may receive captured data from a capture system, either directly or through an intermediate computer or system (e.g., in-vehicle computer, hand-held computer), for analysis. The identification system may perform the requested analysis and return a result of the analysis back to the capture system either directly or indirectly through the same or different intermediate systems without assistance from the evidence management system.

An identification system may receive captured data in addition to records of identified data and/or alignment data to perform analysis using one or more databases and/or techniques that are not accessible to an evidence management system and/or a capture system.

A capture system may analyze captured data in real-time or near real-time. A capture system may provide the result of analysis to an evidence management system for storage and/or further analysis. A capture system may provide the result of analysis to an identification system for further analysis.

An advantage of performing analysis of captured data on capture system 110 is that evidence management system 120 is relieved of the burden of performing the analysis. In evidence ecosystem 100 that includes many capture systems 110, analysis performed by capture systems 110 may relieve evidence management system 120 of a substantial computational burden thereby making the functions of evidence management system 120 easier and more efficient to perform. Analysis on capture system 110 generates additional data (e.g., identified data, records of identified data, alignment data) for transfer to evidence management system 120, so analysis performed on capture system 110 trades the time of data transfer against processing time on evidence management system 120. Further, when analysis is performed on a capture system 110 and the results of analysis are transferred to evidence management system 120, evidence management system 120 may immediately use the additional data to generate reports and/or to redact the captured data to provide a public version of the captured data.

A further advantage of performing analysis of data on capture system 110 is that a result of the analysis is available in real-time or near real-time.

A further advantage of performing analysis of data on capture system 110 is that processing may be performed without requiring a communication link between capture system 110 and another other system in evidence ecosystem 100.

In the implementation of capture system 110 and identification system 130, analysis of captured data is performed by a system referred to as identification processor 260. Identification processor 260 in turn includes one or more identification circuits 400.

Some or all analysis may be performed by an identification circuit. An identification circuit receives captured data and performs analysis on the captured data. An identification circuit may perform analysis to detect one or more properties of captured data. An identification circuit may return a result of the analysis. A result of analysis includes data regarding the captured data. The data that results from analysis may be referred to as identified data, as discussed above. An identification circuit may create the record that stores the information regarding the identified data. An identification circuit may generate and store alignment data.

An example of an evidence ecosystem includes evidence ecosystem 100 which is presented hierarchically in FIGS. 1-7. Evidence ecosystem 100 includes capture system 110, evidence management system 120, identification system 130, network 140, and communication links 112, 122, and 132. Evidence ecosystem 100 may optionally further include hand-held computer 150, in-vehicle computer 160, and communication links 114, 116, 152, and 162.

Evidence ecosystem 100, capture system 110, evidence management system 120, identification system 130, hand-held computer 150, and in-vehicle computer 160 perform the functions of a capture system, an evidence management system, an identification system, a hand-held computer, and an in-vehicle computer respectively as discussed above.

The systems of an evidence ecosystem may communicate with each other. Communication includes transmitting (e.g., sending), receiving, and/or forwarding data. Data may include captured data, identified data, records of identified data, descriptive data, alignment data, and/or notifications (e.g., alerts) as discussed herein.

Capture system 110 may detect physical properties of its environment and capture the detected information as captured data. Capture system 110 may transmit captured data to any system of evidence ecosystem 100 (e.g., evidence management system 120, identification system 130, hand-held computer 150, in-vehicle computer 160) via communication links 112-116. Capture system 110 may analyze captured data. Capture system 110 may transmit the identified data that results from analysis to any system of evidence ecosystem 100. Capture system 110 may generate (e.g., produce) and/or store alignment data that identifies how identified data relates to captured data. Capture system 110 may transmit the alignment data to any system of evidence ecosystem 100.

Capture system 110 may provide captured data to identification system 130 so that identification system 130 may analyze captured data. Even though capture system 110 may include some ability to analyze captured data, identification system 130 may include greater capacity (e.g., faster analysis, more complex analysis, larger captured data) to perform the same type of analysis as capture system 110 or different types of analysis that capture system 110 cannot perform. When identification system 130 receives captured data for analysis directly from capture system 110 or via hand-held computer 150 and/or in-vehicle computer 160, identification system 130 may return the record of identified data and/or the alignment data to capture system 110.

Capture system 110 may include any type of equipment that detects one or more physical properties of the environment around the equipment and stores data regarding the detected properties. Capture system 110 may include cameras, video cameras, digital video cameras, microphones, vibration recorders, heat detectors, infrared detectors, radiation detectors, and biological detectors.

Identification system 130 may provide the identified data, records of identified data, and/or alignment data to evidence management system 120 even though the captured data was not provided to identification system 130 by evidence management system 120. In the event that identification system 130 receives captured data from capture system 110, and not via evidence management system 120, identification system 130 may provide records of identified data and alignment data to evidence management system 120 solely or in addition to providing records of identified and/or alignment data to capture system 110. In the event that identification system 130 provides identified and/or alignment data to evidence management system 120, identification system 130 may provide the captured data to evidence management system 120 in addition to the identity of the capture system that provided the captured data, which in this example is capture system 110.

A capture system or any other system of evidence ecosystem 100 may be identified by a number such as a serial number. A serial number may be a unique number.

Evidence ecosystem 100 may include any number of capture systems 110, in-vehicle computers 160, and/or hand-held computers 150. Various capture systems 110 may detect the same or different types of physical properties (e.g., video, audio, infrared, radiation).

Capture system 200 discloses an implementation of a capture system including capture system 110.

Evidence management system 120 may receive captured data, identified data, and/or alignment data from one or more capture systems, such as capture system 110 and others (not shown). Evidence management system 120 stores the capture data, records of identified data, and/or alignment data that it receives. Evidence management system 120 may receive and store data in a manner that protects the integrity of the data so that the data may be used as evidence in a proceeding. Evidence management system 120 may communicate with the other systems of evidence ecosystem 100 via communication link 122.

Evidence management system 120 may receive captured data, records of identified data, and/or alignment data from one or more identification systems, such as identification system 110 and others (not shown).

Evidence management system 120 may receive captured data, records of identified data, and/or alignment data from one or more capture systems via one or more in-vehicle computers and/or hand-held computers.

Evidence management system 120 may receive data from capture systems 110 that are controlled and/or operated by personnel of different groups (e.g., agencies). Evidence management system 120 may identify the source of captured data and store the data so that it is associated with the person (e.g., user) that captured the data and the agency to which the person belongs. Evidence management system 120 may permit personnel of a particular agency to control and access the data associated with their agency, but not the data associated with any other agency.

Evidence management system 120 may analyze captured data. Evidence management system 120 may store the result of analysis (e.g., record of identified data, alignment data). Evidence management system 120 may generate or have generated additional identified data and alignment data. Evidence management system 120 may provide captured data to identification system 130. Identification system 130 may analyze the captured data and provide the result (e.g., record of identified data, alignment data, alert data) back to evidence management system 120.

The types of data analysis performed by evidence management system 120 may be the same types of analysis performed by capture systems 110 or identification system 130, or additional types of analysis. Evidence management system 120 may use a larger data set (e.g., larger amount) than capture system 110 to perform analysis that is the same as a capture system to augment the identified data and/or alignment data of a capture system 110.

Evidence management system 600 discloses an implementation of an evidence management system including evidence management system 120.

Evidence management system 120 may generate reports and/or summaries of captured data. Evidence management system 120 may generate reports that use captured data or an assessed (e.g., analyzed) form of captured data. A report generated by evidence management system 120 may analyze and/or synthesize captured data and/or identified data from many capture systems that are part of evidence ecosystem 100. Evidence management system 120 may identify data to include and/or exclude from a report. Evidence management system 120 may use a result of analysis (e.g., records of identified data, alignment data) from a capture system to form (e.g., generate) a report thereby relieving evidence management system 120 from the burden of doing the analysis prior to generating the report.

Evidence management system 120 may provide copies of captured data to individuals, government, or other groups or present captured data on a display. The copies of captured data provided by evidence management system 120 may be provided as evidence or for public release. A presentation of captured data may be made to a group that cannot or should not view the captured data without redaction. A copy or presentation of captured data may be redacted in accordance with the recipient or viewer of the captured data. Data intended for public release may be more heavily redacted than data indented for release to a private or government entity. Analysis performed on captured data may identify the content of captured data so that a decision may be made as to whether a portion of the captured data should be redacted prior to release.

Captured data may be analyzed to identify things that likely should be redacted from a copy or presentation of the captured data. With respect to video data that includes an audio track, captured data may be analyzed, by evidence management system 120, capture system 110, or identification system 130, to identify such things as identifiable faces, identifiable tattoos, inappropriate language, graphic scenes, a person's name, a home address, a witness name, bystanders, vehicle license plate, vehicle color, vehicle occupants, vehicle VIN, statements made by witnesses, statements made by officials (e.g., police officers), and geographical locations (e.g., street sign, house address).

The types of information that might be identified in captured audio/visual information is provided in Tables 1-3 below. Not all identified information from captured data need be omitted from a copy or presentation of captured data, so processing captured data to identify more than what will be omitted is not a problem. The data that should be omitted from a report, a copy of captured data, and/or a presentation of captured data may be controlled by a list that identifies the types of information that should not be release to the intended recipient. A list may include rules (e.g., formulas) for determining what should be redacted or not redacted.

Controlling redaction by rules in accordance with the information that is stored in records of identified data means that many different versions of the captured data may be efficiently produced for different intended recipients by using different rules for each recipient. Using the information in the records of identified data and the alignment data means that the captured data may be analyzed once and redacted many different times quickly and efficiently.

Alignment data may provide sufficient specificity as to the location of identified data in the captured data to enable exact and efficient redaction of captured data. Alignment data identifies a location in the captured data where the identified data is located. If the alignment data accurately identifies the location of the identified data in the captured data, the location of the identified data may be redacted from the captured data without redacting the portions (e.g., remainder) of the captured information that do not need redacting.

For example, suppose that captured data must obscure all identifiable faces and license plate numbers captured in video prior to public release. The analysis process identifies faces and license plates in the captured video data. If the alignment data, which identifies the location of the identified faces and license plates, specifies each frame where faces and license plates appear, the redaction processor may quickly locate the frames that include faces and license plates so the frames may be withheld or modified.

If the alignment data further provides the location (e.g., pixels) in the video frame where the face or the license plate appears then redaction may be even more accurate, efficient by computer generation. If the alignment data further provides the extent (e.g., shape, size) of the face or license plate in the captured data, then only the face and/or the license plate may be redacted and not the environment that surrounds the face and the license plate. Captured data may be analyzed with respect to a coordinate system (e.g., grid) so that the exact portions (e.g., pixels) of an identified object may be identified (e.g., found) in the alignment data to aid in fast and accurate redaction of only a portion of the captured data.

Accurate identification of items in captured data and specific alignment data may provide sufficient information for accurate and minimal redaction in real-time during playback of captured video data.

Identification system 130 analyzes captured data to identify properties of the captured data. The properties identified by identification system 130 are consistent with the type of physical properties detected and captured in a captured data. Identification system 130 analyzes captured data to identify patterns in the data or occurrences of particular properties in the data.

The patterns and/or information searched for in captured data may be specified by a person. The patterns and/or information searched for by identification system 130 may be specified by a prior analysis such that the result of an earlier analysis is used as the pattern and/or information for subsequent analysis. The patterns and/or information may be consistent with the purpose for which the captured data was captured. For example, if the captured data relates to seismic activity, a person may be interested in analyzing the data to show peak seismic forces and the gradient of the seismic forces that lead up to the peak. For captured data that relates to thermal properties, a person may be interested in identifying the temperature extremes or possibly relating temperatures to objects. Relating temperatures to objects would require identifying objects, which may require visual information (e.g., video, photographic) in addition to temperature information.

The patterns and/or information (e.g., signatures, fingerprints, properties) used for analyzing captured data are particular to the sensor that detected the physical properties and to the manner in which the data was captured (e.g., stored, encoded). Many different patterns (e.g., templates) may be developed to try to identify the same type of property and/or object in captured data. When a pattern is identified in captured data, that data so identified is referred to as identified data as discussed above.

Patterns may need to be applied to captured data in a specific order or in a specific manner (e.g., way). A processing circuit may be used to apply the patterns to the captured data and to assess the result of the application. A processing circuit may apply a pattern to captured data by performing one or more mathematical operations on the captured data. A processing circuit may execute a stored program to apply a pattern. The instructions executed by a processing circuit may be particular to the type of patterns and/or type of data being analyzed. Executable instructions (e.g., code) and patterns may be developed together (e.g., paired) so that the processing circuit may perform a particular algorithm for analyzing a particular type of captured data. Code and patterns may be used by processing circuits operating in parallel on the same captured data to efficiently identify properties in the captured data.

A processing circuit may create a record of identified data as discussed above.

Identification system 130 may further identify where the identified data is located in captured data. Identification system 130 may produce alignment data with respect to identified data as discussed above.

Identification system 130 may receive captured data for analysis from capture system 110, directly or indirectly, and/or from evidence management system 120. The transmission of the captured data may include a request for the type of analysis to be performed. Identification system 130 may deduce the type of analysis to perform based on the source of the data because a particular capture system may produce only one type of captured data.

Identification system 130 may returns the result of analysis (e.g., identified data, alignment data) to the system (capture system 110, evidence management system 120) that provided the captured data or to evidence management system 120 in addition to the system of origin.

The functions performed by identification system 130 may be incorporated into and performed in whole or part by evidence management system 120 and/or capture system 110.

Identification system 700 discloses an implementation of an identification system including identification system 130. Identification system 700 may further be an implementation of identification processor 260 or 680.

The types of patterns and information identified by an identification system, including identification system 130 and/or identification processor 260/680 discussed below, for captured audio/visual information may include the types of information identified in Tables 1-3 below. Analysis of the audio/visual information may include semantic analysis that identifies spoken and written language, visual analysis that identifies characteristics, including patterns, of the visual information, and audio analysis that identifies characteristics, including patterns, of the audio information.

Semantic analysis may include speech recognition in which an identification system or circuit identifies words that are captured in the audio portion of captured data. Semantic analysis may include the analysis and recognition of identified word to identify phrases, the meaning of phrases, and possibly to infer the intentions of the person uttering the words or phrases.

Semantic analysis may include character recognition in which an identification system or circuit identifies the characters captured in the visual portion of captured data. Semantic analysis may include the identification of words from the characters, phrase from the words, and the meanings of words and/or phrases. Determining the meaning of a word or a phrase may provide information such a geographic location, identification of a person or place, or other information. Once a written word or a phrase is identified, additional analysis may be required to relate the word or phrase to a place, person, and/or thing.

The semantic analysis of captured audio/visual information may identify the following language related information in both the visual data and audio data. Semantic analysis includes identifying words or phrases that appear in the visual portion of the captured data and words, phrases or types of information spoken in the audio portion of the captured data.

The semantic analysis identifies the types of information provided below and the location (e.g., alignment data) of the identified data in the captured data.

The words, phrases, and type of semantic information identified below are only representative and are not limiting. Semantic analysis may be performed on audio or visual (e.g., written) information. For example, names and addresses may be identified in audio captured data spoken by anyone near the capture device. Names and addresses may also be identified in visual captured information such as images of driver's licenses.

TABLE 1

| Semantic Analysis | |
| --- | --- |
| Particular words: | Obscenities, racial epithets, threats |
| Personal information: | Height, weight, race, sex |
| | Name, social security number |
| | Home address, business address |
| | Phone numbers |
| | Religion, political affiliation |
| Incident (police) data: | Location of the incident |
| | Incident type (e.g., parking, burglary) |
| Environmental information: | Weather, time of day, location |
| Vehicle information: | License plate number |
| | Vehicle type, model, color, condition |
| | Vehicle occupants |
| Action words: | Run, hide, hit, punch, shoot |
| Commands by officer: | "stay in car", "don't move" |
| Geographic information: | Written information on street signs, building or house numbers, spoken location, spoken direction of travel |

Visual analysis of captured audio/visual information may identify the below types of objects or occurrences in the visual portion of the captured data in addition to the location (e.g., alignment data) of the identified object or occurrence in the captured data.

The visual information identified below is only representative and is not limiting.

TABLE 2

| Visual Analysis | |
| --- | --- |
| Geographic data: | Street signs, buildings, bridges, skyscrapers, rivers, bodies of water |
| Weapons: | Firearms, handguns, rifles |
| | Conducted electrical weapons ("CEW") |
| | Knives, swords, box cutters |
| | Brass knuckles |
| | Muzzle flash, recoil movement |
| | CEW launch or warning arc |
| | Empty holster, draw from holster |
| People: | Face, eyes, tattoos, height, rings, piercings |
| Contraband: | Drugs, drug paraphernalia |
| Animals: | Dogs, snakes, cats, dead animals |
| Medical: | Panting person, shaking person, screaming face, blood puddle, blood splatter, man down, mutilated bodies, corpses |
| Vehicles: | Cars, trucks, semi-tractors, motorcycles, scooter, license plate, VIN, interior |
| Movement of objects, including humans, in the field of view of the capture system that are: | Fast, suspicious, directed toward a human, weapons in use |

The audio analysis of captured audio/visual information may identify the below types of sounds in the audio portion of the captured data in addition to the location (e.g., alignment data) of the identified sound in the captured data.

The sounds identified below are only representative and are not limiting.

TABLE 3

| Audio Analysis | |
| --- | --- |
| Environmental: | Traffic, gunshot, collision, sirens, explosions |
| Related to people: | Sounds that indicate anger or threats (e.g., yelling), pain (e.g., crying, whimpering, groaning), fear (e.g., screaming). |
| Voice identification: | Identification of different voices, and thus possibly people, by voice analysis. |

TABLE 3-continued

| Audio Analysis | |
| --- | --- |
| Potential human emotion: | Assessment of possible human emotions indicated by a sound (e.g., anger, threatened, threatening, fear, hatred) |

When captured data is analyzed by an identification process of the capture system, identifying particular characteristics (e.g., patterns) in the captured data may result in an alert. A capture system may take an action responsive to an alert. Responsive to an alert, a capture system may capture additional information. Responsive to an alert, a capture system may transmit captured data to identification system 130 for further or advanced analysis, receive a result of analysis from identification system 130, and perform a further action responsive to the result of analysis from identification system 130. Responsive to an alert, a capture system may transmit a message.

Table 4 below identifies some alerts that may result from analysis of captured audio/visual data and an action that may be taken by a capture system in response to the alert.

TABLE 4

| Alerts and Reponses | |
| --- | --- |
| Cause of Alert | Action taken |
| Detect a person's face | Take a high-resolution photo of the face. |
| Detect a person's face | Take a high-resolution photo of the face, send the high-resolution photo or the captured data to identification system 130, identification system 130 performs facial recognition, compares the facial data to databases, and returns the name of the person identified to the capture system or to a hand-held computer carried by the user of the capture system. The capture system and/or the hand-held computer provides the name of the person to the user of the capture system. |
| Detect license plate | Take a high-resolution photo of the license. |
| Detect license plate | Take a high-resolution photo of the license plate, send the high-resolution photo or the captured data to identification system 130, identification system 130 detects the license plate number, identifies the registered owner of the vehicle and returns the owner information to the capture system or to a hand-held computer carried by the user of the capture system. The capture system and/or the hand-held computer provides the name of the registered owner to the user of the capture system. |
| Detect firing of a firearm | Transmit a message to dispatch that backup may be needed. |
| Detect a medical condition (e.g., man down, blood) | Transmit a message to dispatch that medical help may be needed. |
| Detect weapon drawn | Transmit a message to dispatch that backup may be needed. |
| Detect muzzle flash | Transmit a message to dispatch that backup may be needed. |
| Detect threat (e.g., weapon, muzzle flash, fast movement) | Switch capture system from storing captured data in a temporary buffer (e.g., pre-event buffer) to the recording mode. |

Alert circuit 270, discussed below, may monitor the results of analysis, determine whether an alert condition has occurred, and instruct that a corresponding action be taken consistent with the alert condition. Messages sent by capture system 110 to dispatch (e.g., dispatch for a security agency, office, head quarters) may be sent directly by capture system 110 or messages may be forwarded to hand-held computer 150 or in-vehicle computer 160 for transmission to the intended recipient of the message.

Messages generated by identification system 130 responsive to an alert may be sent to hand-held computer 150 or in-vehicle computer 160 associated with the user of capture system 110 so that the user may see or hear the information via those systems.

Messages generated by identification system 130 responsive to an alert may be sent to capture system 110 for display or delivery to a user. Messages generated by identification system 130 responsive to an alert may be sent to capture system 110 then forward to hand-held computer 150 or in-vehicle computer 160 for display to the user of capture system 110.

Hand-held computer 150 includes any type of computer that is hand-held. Hand-held computer 150 includes a smart phone, a tablet, and a netbook.

In-vehicle computer 160 includes any type of computer that conventionally is positioned in a vehicle or may be positioned in a vehicle. In-vehicle computer 160 includes any mobile data terminal conventionally used in police vehicles, laptop computers positioned in a vehicle, communications systems (e.g., radio, data) capable of receiving and/or transmitting data, or performing computations on data.

Communication links 114 and 116 between capture system 110 and hand-held computer 150 and in-vehicle computer 160 respectively, communication link 122 between evidence management system 120 and network 140, communication link 132 between identification system 130 and network 140, communication link 152 between hand-held computer 150 and network 140, and communication link 162 between in-vehicle computer 160 and network 140 may be any conventional communication link (e. g., channel) that communicates (e.g., transmits, receives) data using any conventional wired or wireless protocol.

Preferably, communication links 112, 114, and 116 are wireless communications links. Communication links 114 and 116 may be established as peer-to-peer links or links established via an access point or base station. Communication links 114 and 116 may be provided by short-range, lower power communication circuits (e.g., transceivers, transmitter, receiver). Communication link 112 may be provided by a longer-range, higher power communication circuit.

Preferably, communication links 122 and 132 are high speed links for transferring large amounts of data to evidence management system 120 and/or identification system 130 and between evidence management system 120 and identification system 130.

Preferably, communication links 162 and 152 are wireless links capable of transferring via a high-power, high-speed link.

Network 140 may be any network with suitable communication protocols to enable communication between the various systems of evidence ecosystem 100.

Implementations of various systems of evidence ecosystem 100 are disclosed in FIGS. 2-7. The implementations are discussed below.

Capture system 200 discloses an implementation of a capture system including capture system 110. Capture system includes communication circuit 210, processing circuit 220, memory system 230, sensor 240, capture processor 250, identification processor 260, and alert circuit 270. Capture system 200 performs the functions of a capture system discussed herein. Communication circuit 200, processing circuit 220, sensor 240, and capture processor 250 perform the functions of a communication circuit, a processing circuit, a sensor, and a capture processor discussed herein. Memory system 230 performs the functions discussed with respect to a memory system and memory system 300 discussed herein.

A memory system may include computer-readable medium. A computer-readable medium may store, retrieve, and/or organize data. As used herein, the term "computer-readable medium" includes any storage medium that is readable and/or writeable by an electronic machine (e.g., computer, server, computing device, processor, processing circuit, transceiver, DMA circuit). Storage medium includes any devices, materials, and/or structures used to place (e.g. write), keep (e.g., store), and retrieve (e.g., read) data (e.g., information). A storage medium may be volatile or nonvolatile. A storage medium may include any semiconductor medium (e.g., RAM, ROM, EPROM, Flash), magnetic medium (e.g., hard disk drive), optical medium (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data.

Figure 2:
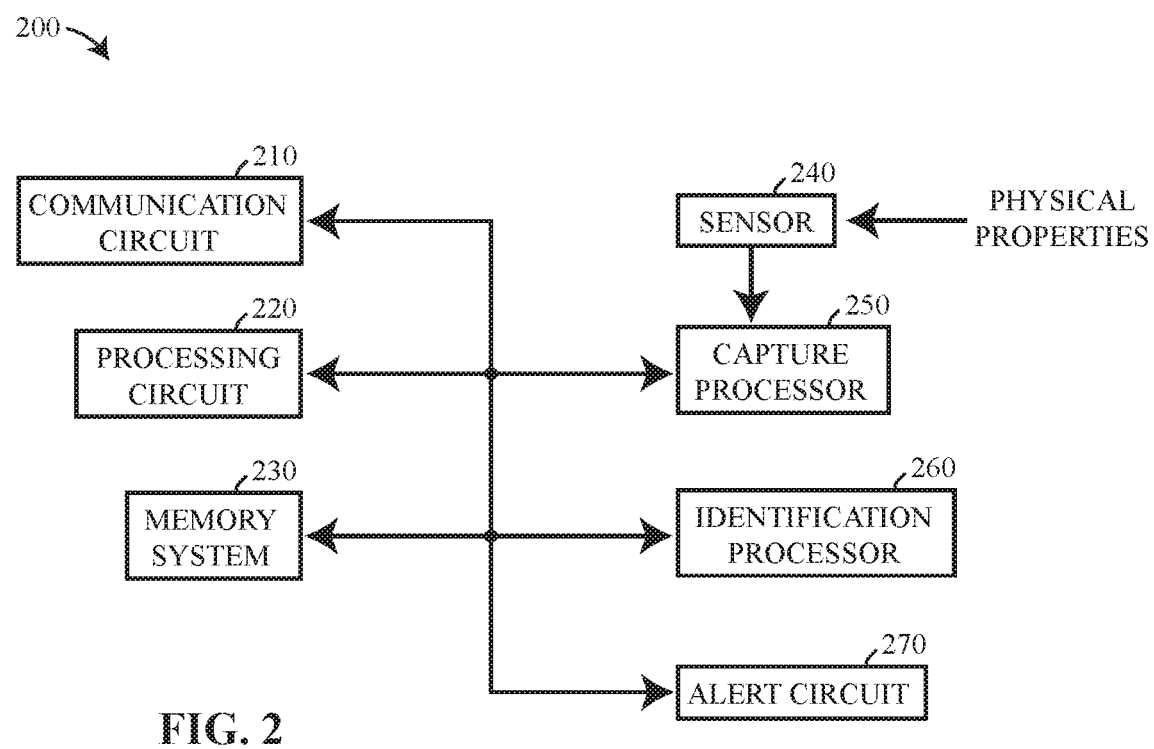
FIG. 2 is a functional block diagram of a capture system.
Figure 3:
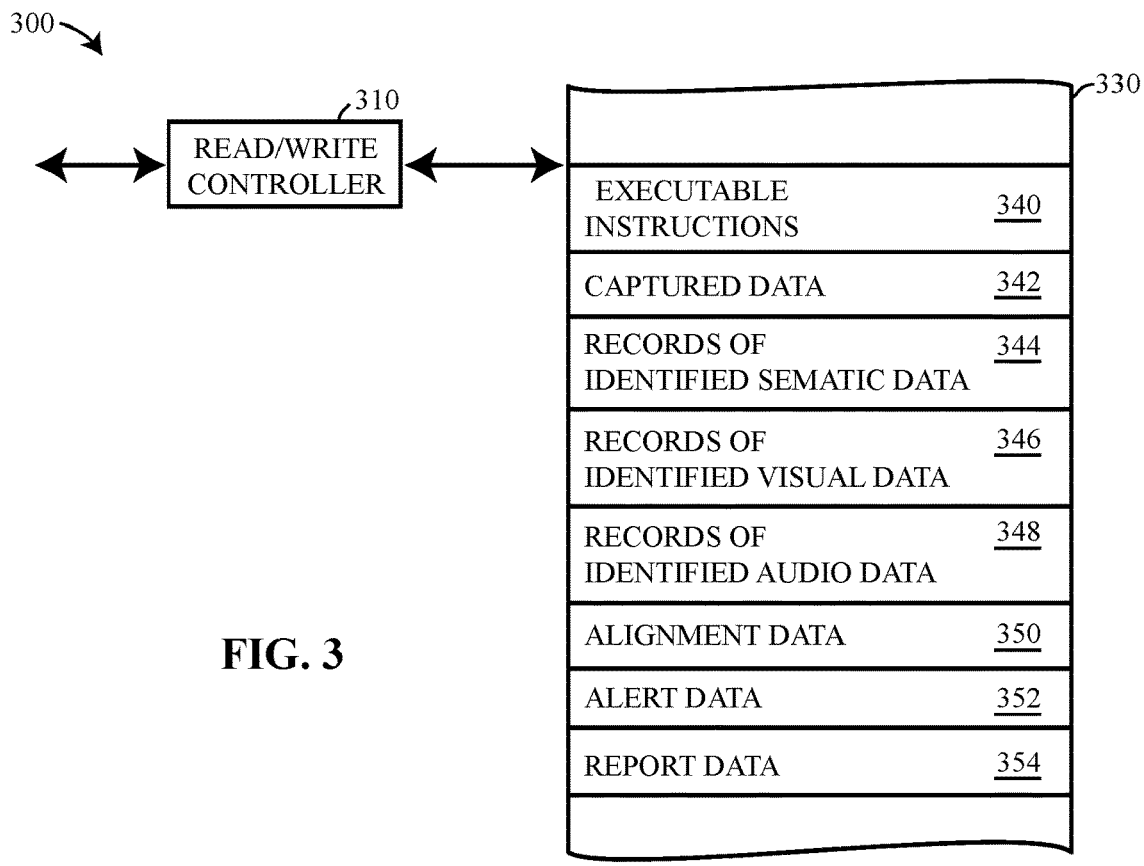
FIG. 3 is a functional block diagram of a memory system.
Figure 4:
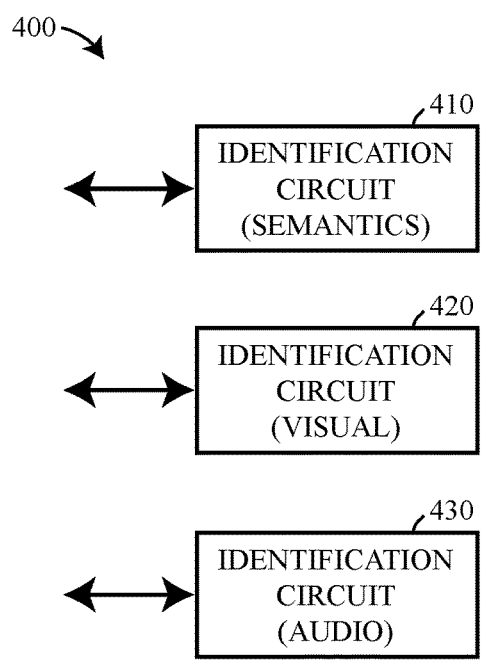
FIG. 4 is a functional block diagram of an identification processor.
Figure 5:
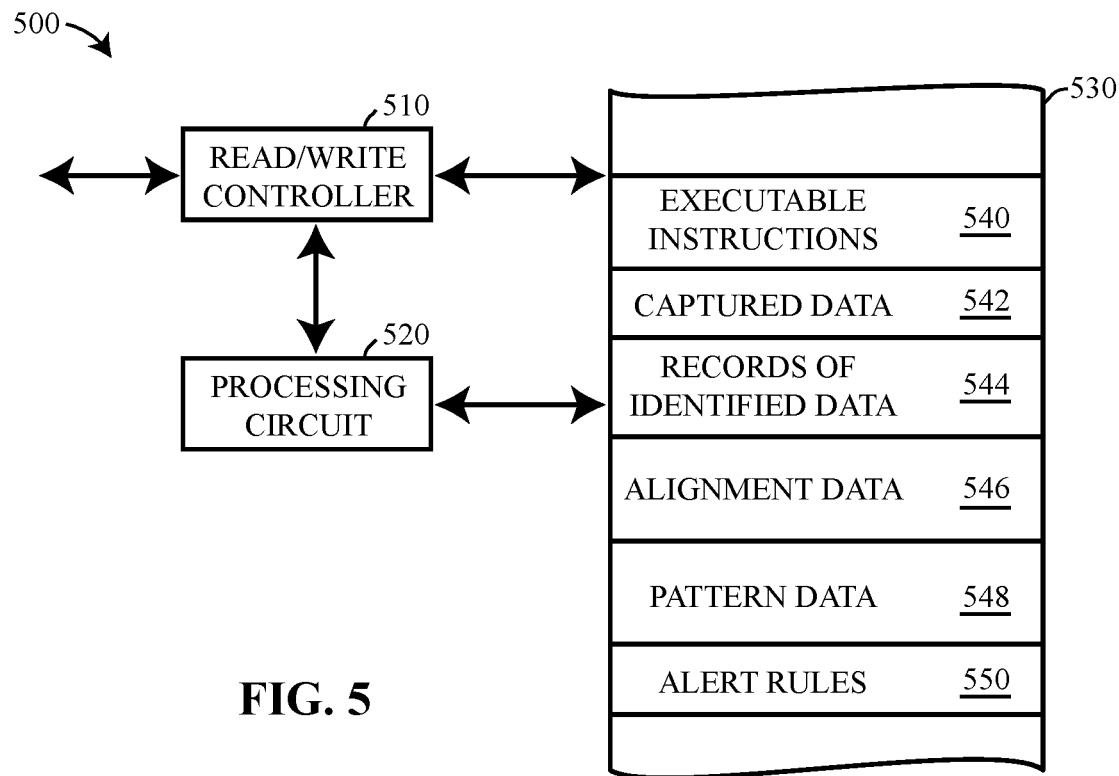
FIG. 5 is a functional block diagram of an identification circuit.
Figure 6:
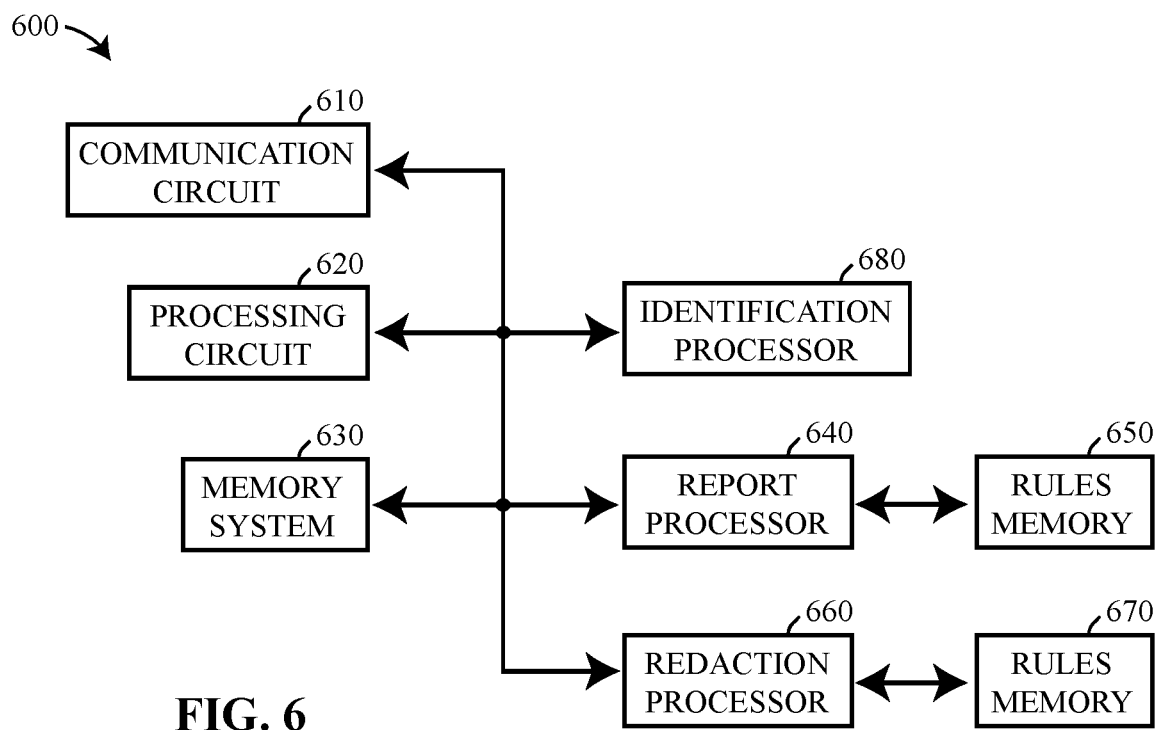
FIG. 6 is a functional block diagram of an evidence management system.
Figure 7:
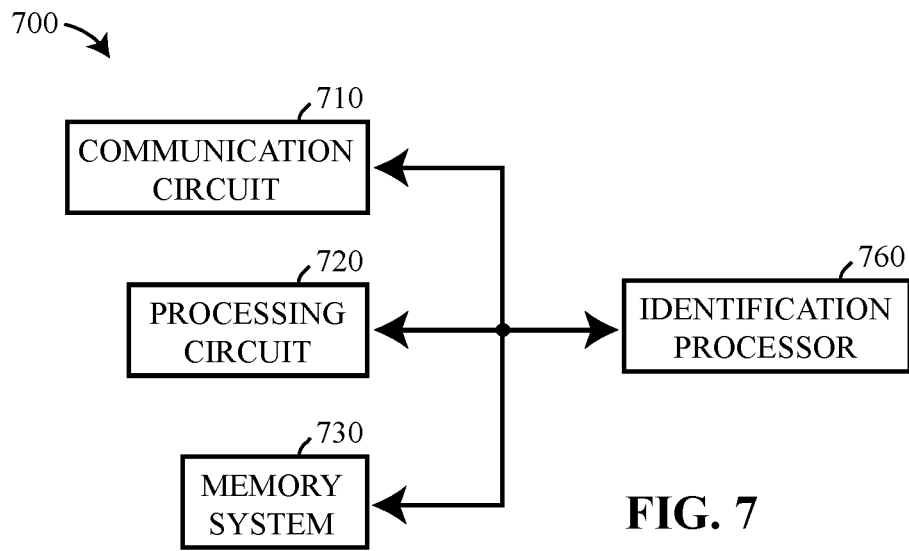
FIG. 7 is a functional block diagram of an identification system.

Memory system 300 discloses an implementation of memory system 230, 630, and 730 of FIGS. 2, 6, and 7 respectively. Memory system 300 includes read/write controller 310 and memory 330 (e.g., computer-readable medium). A read/write controller performs the function of controlling read and write access to memory 330. A read/write controller may include a direct memory access ("DMA") circuit. A read/write controller may establish and maintain independent steams of data that are written to and/or read from memory 330. Memory 330 performs the functions of a memory and/or a computer-readable medium as discussed herein.

Data stored in a memory may be stored in any conventional manner. Data stored in memory 330 of memory system 300 may include executable instructions 340, captured data 342, records for identified semantic data 344, records for identified visual data 346, records for identified audio data 348, alignment data 350, alert data 352, and report data 354. The data that included in a record of identified data is discussed above. Alignment data 350 may be subdivided for storage into alignment data for semantic identified data 344, visual identified data 346, and audio identified data 348.

Executable instructions 340 may be executed by a processing circuit to perform an operation. An operation may include analyzing captured data, identifying identified data, generating alignment data, creating and storing records for identified data, and creating and storing alignment data.

Captured data 342 may include data captured by one or more capture systems when memory system 630 and/or 730 is implemented as memory system 300.

Records of identified semantic data 344 includes one or more records of identified data that results from semantic analysis of captured data 342 such as analysis performed by identification processor 260, 680, and/or 760, or depending on the implementation, identification circuit 410. Records of identified visual data 346 includes one or more records of identified data that results from visual analysis of captured data 342 such as the analysis performed by identification processor 260, 680, and/or 760, or depending on the implementation, identification circuit 420. Records of identified audio data 348 includes one or more records of identified data that results from audio analysis of captured data 342 such as the analysis performed by identification processor 260, 680, and/or 760, or depending on the implementation, identification circuit 430.

Alignment data 350 may include data to align identified semantic data 344, identified visual data 348, and/or identified audio data 350 to captured data 342. Alignment data may be stored as part of the record of identified data for each identified semantic data, visual data, and/or audio data or separately as shown in alignment data 350 and associated to the various records of alignment data.

Alert data 352 includes data generated responsive to the analysis of captured data. Alert data 352 may be generated all or in part by alert circuit 270 and/or processing circuit 220.

Report data 354 may be generated all or in part by report processor 640 and/or processing circuit 220.

The type of data stored in a memory system will depend on the function performed by the system of which the memory system is a part. For example, the memory system of a video capture system may store executable instructions 340, captured data 342, identified semantic data 344, identified visual data 346, identified audio data 348, alignment data 350, and alert data 352, but omit report data 354. The memory system of a thermal capture system may store executable instructions 340, captured data 342, identified visual data 346, and alignment data 350 depending on the type of thermal detector. The memory system for a thermal capture system may store additional data not show in FIG. 3 such as identified thermal data, identified hot spots data, identified thermal gradients data, or other data related to thermal properties and/or the type of analysis performed on the captured data.

Identification processor 400 discloses an implementation of identification processor 260, 680, and/or 760. Identification processor 400 includes one or more identification circuits. Each identification circuit may, through appropriate executable instructions and patterns, operate to identify a particular type of characteristic (e.g., pattern, object, trend, value) in captured data. Identification processor 400 includes identification circuits suitable for analyzing video and audio data captured by a video camera. Identification processor 400 includes identification circuits 410-430. Identification circuit 410 analyzes semantic (e.g., speech, language) properties of visual and audio captured data. Identification circuit 420 analyzes visual properties of captured video (e.g., images). Identification circuit 430 analyzes audio properties of audio captured data. Identification processor 400 may include additional identification circuits suited to identify characteristics that are different from and/or in addition to semantic, visual, and/or audio characteristics.

At least some semantic properties identified by identification circuit 410 are shown in Table 1. At least some visual properties identified by identification circuit 420 are shown in Table 2. At least some audio properties identified by identification circuit 430 are shown in Table 3.

Identification circuit 500 discloses an implementation of identification circuit 410, 420, and/or 430. Identification circuit 500 includes read/write controller 510, processing circuit 520, and memory 530. Read/write controller 510 performs the functions of read/write controller 310 discussed herein. Processing circuit 520 and memory 530 perform the functions of a processing circuit and a memory respectively as discussed herein. Read/write controller 510 and memory 530 cooperate to perform the functions of a memory system discussed above.

Data stored in memory 530 of identification circuit 500 may include executable instructions 540, captured data 542, records of identified data 544, alignment data 546, pattern data 548, and alert rules 550.

Executable instructions 540 may be executed by a processing circuit to perform the analysis of captured data 542. Executable instructions 540 are suitable for the type of analysis that the identification circuit performs. The instructions for semantic analysis will be different from the instructions for audio, visual, thermal, or radiation analysis because the functions performed by the processing circuit to perform the analysis likely will be different for the different types of analysis. Pattern data 548 is also particular to the type of analysis performed by the identification circuitry. Pattern data includes the types of patterns (e.g., signatures, fingerprints, properties, objects) that should be identified in captured data 542 by the operation of processing circuit 520. Executable instructions 540 and pattern data 548 may be stored in the memory of identification circuit 500 to enable identification circuit 500 to perform the type of analysis required for the type of captured data provided.

Pattern data may be the result of machine learning. Machine learning to detect a particular physical characteristic or object may be performed by the processing circuit or system that captures (e.g., capture system 110), stores (evidence management system 120), or analyzes (e.g., identification system 130) captured data; however, it is possible that other machines perform the machine learning and the result of the machine learning, in the form of a pattern, is used by capture system 110, evidence management system 120, and/or identification system 130 to perform analysis of captured data.

Data from one or more capture systems may be used as the data set for a processing circuit to extract and/or determine patterns to recognize speech, written characters, objects, movement, semantic information, or other information from captured data. A processing circuit may learn patterns from the data set using supervised (e.g., predictive modeling) and/or unsupervised learning. In the case of supervised learning, a human may categorize (e.g., label) the frames of the data set to enable training. The same data set with different labels may be used to for learning the patterns for many different types of objects or outcomes.

A processing circuit may perform any type of conventional analysis or transformation of captured data prior to determining whether the captured data matches or is consistent with a pattern. Analysis or transformation of captured data to determine whether the captured data is consistent with a pattern includes any type of mathematical operation to analyze and/or transform the captured data for comparison to the pattern.

Alert rules 550 provide rules for providing alerts. An alert may be provided upon detecting a particular type of property, quality, or pattern in the captured data. An alert may be used to instruct processing circuit 520 to perform additional processing. An alert may be transmitted by processing circuit 520 to alert circuit 270 so that capture system 200 will take further action responsive to the alert. For example, upon detecting a face in visual captured data, an alert rule may specify that a high-resolution photo be take of the face if possible. The alert may be sent to alert circuit 270, which in cooperation with processing circuit 220 and capture processor 250 capture the high-resolution still and store it in memory. Alignment data and a log of the alert may also be stored.

Captured data 542 may be provided by capture system 200. After analysis, the identification circuit provides one or more records of identified data and alignment data to capture system 200 for storage in memory system 230.

Identification processor 260 and identification circuits 500 may receive captured data and provide one or more records of identified data and/or alignment data in real-time or near real-time. Identification circuits 410, 420, and 430 may perform operations on captured data in parallel (e.g., at about the same time) to provide greater processing throughput. Each identification processor, if implemented as identification circuit 500, may include an independent memory system for greater speed in processing. In an implementation, identification circuits 410, 420, and 430 each have a respective processing circuit 520, but share read/write controller 510 and memory 530.

Processing circuit 220 and memory system 230 may perform some or all of the functions of identification processor 260.

Evidence management system 600 discloses an implementation of evidence management system 120. Evidence management system 600 includes communication circuit 610, processing circuit 620, memory system 630, report processor 640, rules memory 650, redaction processor 660, and rules memory 670. In an implementation, the rules stored in rules memories 650 and 670 may be stored in memory system 630 and memories 650 and 670 eliminated.

Evidence management system 600 performs the functions of an evidence management system discussed herein. Communication circuit 610, processing circuit 620, and memory system 630 perform the functions of a communication circuit, a processing circuit, and a memory system (e.g., memory system 300) respectively discussed herein. Rules memories 650 and 670 may be implemented as a memory system such as memory system 300.

Processing circuit 620 may perform the functions of report processor 640 with suitable executable instructions and rules. Processing circuit 620 may perform the functions of redaction processor 660 with suitable executable instructions and rules. The functions of report processor 640, rules memory 650, redaction processor 660, and rules memory 670 may be performed all or in part by processing circuit 620 and memory system 630.

Identification System 700 discloses an implementation of identification system 130. Identification system 700 includes communication circuit 710, processing circuit 720, memory system 730, and identification processor 760.

Identification system 700 performs the functions of an identification system discussed herein. Communication circuit 710, processing circuit 720, and memory system 730 perform the functions of a communication circuit, a processing circuit, and a memory system (e.g., memory system 300) respectively discussed herein.

Identification processor 760 performs the functions of an identification processor (e.g., identification processor 400) discussed herein. Identification processor 760 includes identification circuits as discussed above with respect to identification processor 400. Identification processor 760 may include the same, different, or more identification circuits than identification processor 400. Identification processor 400 associated with capture system 110 may include identification circuits relevant to the type of data captured by capture circuit 110. Identification processor 760 may include an identification circuit for every type of data corresponding to every type of capture system 110 that may operate in evidence ecosystem 100.

Processing circuit 720 and memory system 730 may perform some or all of the functions of identification processor 760.

Some or all of the functions of identification system 760 may be performed by processing circuit 620 and memory system 630 of evidence management system 600. Evidence management may include processing circuits that perform the functions of identification system 700.

A communication circuit transmits and/or receives information (e.g., data). A communication circuit may transmit and/or receive (e.g., communicate) information via a wireless link and/or a wired link (e.g., connection). A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA, LTE, BLE) and/or wired (e.g., USB, RS-232, Firewire, Ethernet) communication protocol. A communication circuit may receive information from a processing circuit for transmission. A communication circuit may provide received information to a processing circuit and or a memory system. A communication circuit in one device (e.g., capture system) may communicate with a communication circuit in another device (e.g., hand-held computer, in-vehicle computer, evidence management system, identification system).

A processing circuit includes any circuitry and/or electrical/electronic subsystem for performing a function. A processing circuit may include circuitry that performs (e.g., executes) a stored program. A processing circuit may include a digital signal processor, a microcontroller, a microprocessor, a graphics processing unit, an application specific integrated circuit, neural networks, recurrent neural networks, a programmable logic device, logic circuitry, state machines, MEMS devices, signal conditioning circuitry, communication circuitry, a conventional computer, a conventional radio, a network appliance, data busses, address busses, and/or any combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits, subsystems, and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of buss including any type of conventional data/address bus.

A memory system stores (e.g., writes) data (e.g., information). A memory system provides previously stored data (e.g., reads). A memory system may provide previously stored information responsive to a request for data. A memory system may store information in any conventional format. A memory system may store digital data.

A memory system includes any semiconductor, magnetic, optical technology, or combination thereof for storing information. A memory system may receive information from a processing circuit for storage. A processing circuit may provide a memory system a request for previously stored information. Responsive to the request the memory system may provide stored information to a processing circuit. A memory system may read and write information via a direct memory access ("DMA") circuit.

A memory system includes any digital circuitry for storing program instructions and/or data. Storage may be organized in any conventional manner (e.g., program code, buffer, circular buffer). A memory system may be incorporated in and/or accessible by a transmitter, a receiver, a transceiver, a sensor, a controller, and a processing circuit (e.g., processors, sequential logic).

Data may be organized for storage in a memory system in any conventional way. Data may be organized as a database and stored in a memory system.

Figure 8:
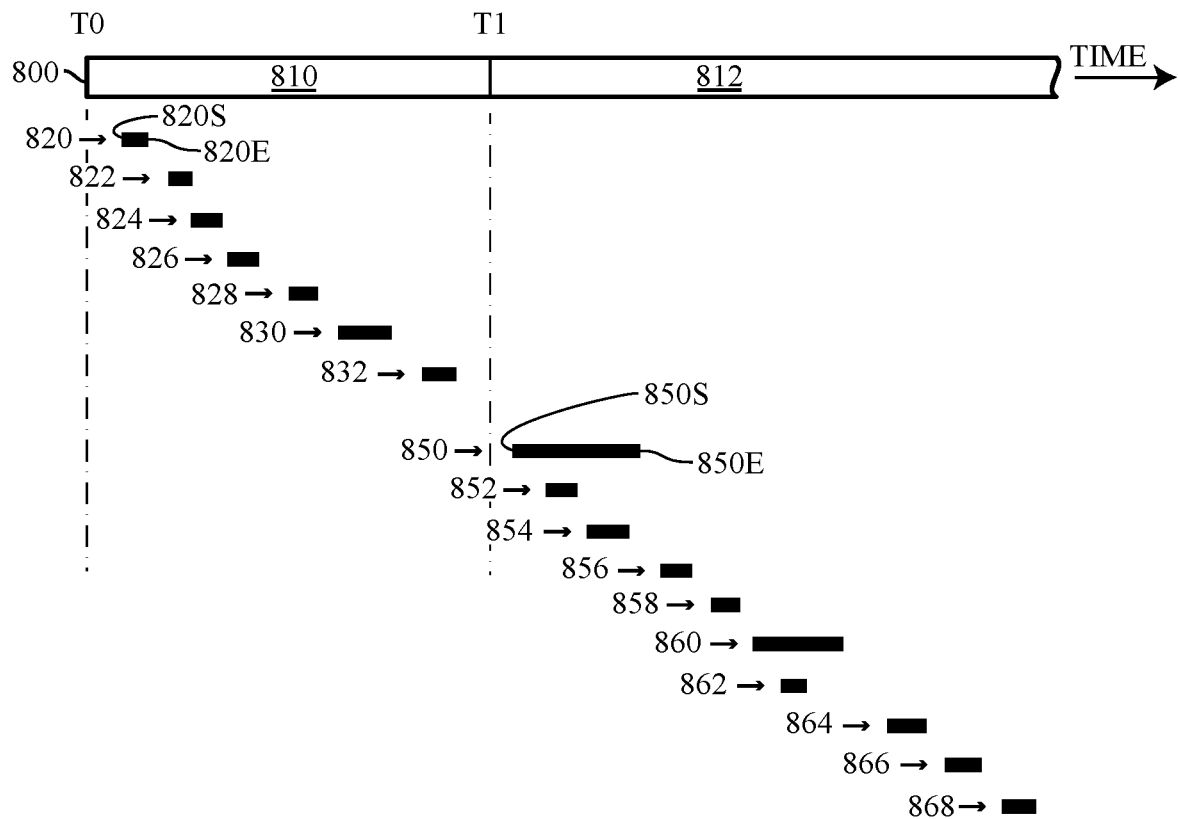
FIG. 8 is a diagram of identified data that is identified during analysis of captured data.

An example of the analysis of captured audio/visual information in accordance with the semantic, visual, and audio characteristics identified in Tables 1-3 and alerts that may be generated is shown in FIG. 8.

Captured data 800 is a record of an event captured as audio/visual data. The captured data starts at time T0 and continues through and past time T1 where at some point in time the event ends. Captured data 800 is arbitrarily divided into segments 810-812. Below captured data 800, semantics identified data, visual identified data, and audio identified data that is identified by an identification circuit (e.g., identification circuit 410) is shown. The position of the identified data (e.g., 820-868) relative to time T0 and time T1 represents the time that the identified data is found (e.g., appears) in captured data 800.

Each identified data (e.g., 820, 822, so forth) appears in captured data 800 at a start time (e.g., 820S, 822S, so forth) and ceases to appear (e.g., ends) in captured data 800 at an end time (e.g., 820E, 822E, so forth). Alignment data includes at least any combination of start time, end time, or duration sufficient to specify where identified data occurs in captured data 800. For example, alignment data may include a start time (e.g., 820S, frame number) and a duration (e.g., 2 seconds, 60 frames) of the identified data, a start time and an end time (e.g., 820E, frame number), and/or an end time and a duration prior to the end time.

As discussed above, a description of the nature of the identified data may be stored in a record of the identified data. As discussed in more detail below, identified data 820 is semantic identified data. The description of the semantic data may include the type of analysis performed (e.g., semantic, visual, audio) and a description of the nature of the identified data (e.g., type: location, location: $5^{th}$ Street). A copy of the pixels that show the street sign may also be stored as part of the record of the identified data. The record may be stored in memory system 344.

The alignment data for identified data 820 may also include the pixels where the street sign appears in captured data between start time 820S and end time 820E. The description of the location with respect to the pixels may be done on a per frame basis, so that the location of the pixels of the street sign is provided for each frame.

The alignment data may be stored in the record of identified data for identified data 820 or the alignment data may be stored separately (e.g., alignment data 350) and associated (e.g., linked to, related to) with the record of identified data for identified data 820.

A record of identified data is created for each identified data 820-868. The records may be stored according to the type of identified data (e.g., semantic in 344, visual in 346, audio in 348) or together regardless of type. In other words, storage areas 344-348 may be merged to store all records of identified data.

A further operation of identifying data in captured data 800 includes generating alerts.

During segment 810, a police officer travels south on $5^{th}$ Street. While traveling on $5^{th}$ Street, the camera captures the image of several street signs including street signs that identify the road as being $5^{th}$ Street. As the officer approaches Elm Avenue, the officer turns on the lights of the cruiser to pull a car over for a traffic violation. The officer states for the record that he is performing a traffic stop and the location, which is at $5^{th}$ Street and Elm Avenue. The vehicle being signaled to pull over pulls off the road. The officer pulls the cruiser in behind the vehicle and exits the cruiser. The camera captures an image of the pulled-over vehicle and of the license plate of the vehicle. The camera further captures and image of street signs at the intersection that identify the intersection as $5^{th}$ Street and Elm Avenue.

During segment 810, captured data 800 includes:

Between start time 820S and end time 820E: an image of a street sign showing $5^{th}$ Street.

Between start time 822S and end time 822E: an image of a street sign showing $5^{th}$ Street.

Between start time 824S and end time 824E: the officer saying "traffic stop".

Between start time 826S and end time 826E: the officer saying $5^{th}$ Street and Elm Avenue.

Between start time 828S and end time 828E: an images of a street signs showing $5^{th}$ Street and Elm Avenue.

Between start time 830S and end time 830E: an image of the vehicle that was pulled over.

Between start time 832S and end time 832E: an image of the license plate of the vehicle showing MVH395.

For clarity, the start and end times (820S, 820E, 850S, 850E) for identified data 820 and 850 are expressly shown. Although the start and end times for the other identified data of FIG. 8 are not shown, an identifier with an S suffix means the start time of the identified data and an identifier with an E suffix means the end time of the identified data. For example, 828S and 828E are the start and end times respectively of identified data 828 even though not expressly shown in FIG. 8.

Segment 810 includes a plurality of frames of visual information and associated audio information. If the analysis is performed by capture system 110, captured data 800 is stored in memory system 230. If memory 230 is implemented as memory system 300, captured data 800 is stored in memory 330 at location captured data 342.

For the data captured during segment 810, identification circuit 410 for identifying semantic data identifies the following spoken or visual language related items:

820: the location as $5^{th}$ Street from an image of a street sign.

822: the location as $5^{th}$ Street from an image of a street sign.

824: the incident type as "traffic stop" as spoken by the officer.

826: the location as 5th Street and Elm Avenue as spoken by the officer.

828: the location as 5th Street and Elm Avenue from an image of street signs.

832: the license plate number MVH395 from an image of a license plate.

A record of identified data is created for each identified data above. The record may include information that the data was identified using semantic analysis. The description in each record if identified data may include the type of semantic data found (e.g., location, incident type, personal information, environmental, vehicle, action words, commands). The description may include the semantic data identified (e.g., name, date, location, address).

For example, the record of identified data for identified data 820 may include:
  analysis type: semantic;
  data type: location;
  data value: 5th Street.

The record for 820 may optionally include a copy of the image of the street sign from captured data 820.

The description of semantic data may include the information show in Table 1 or other language that describes the data that has been semantically identified.

The identified data may span one or more frames of the captured video data or a duration of time of the audio data. Alignment data may include a start time, an end time, and/or a duration as discussed above. For example, the alignment data for identified data 820 may include:
  start time: 820S;
  end time: 820E;
  duration: 2 seconds;
  frame start: frame X;
  frame end: frame X+60;
  location: frame X: description of pixels that show the sign in frame X;
  location: frame X+1: description of pixels that show the sign in frame X+1;
  location: frame X+2: description of pixels that show the sign in frame X+2; and so forth as to the location in each frame.

Start time 822S identifies the time in captured data 810 when the second instance of a street sign showing 5th street first appears. End time 822E identifies the time in captured data 810 when the second instance of the street sign showing 5th street last appears. The record of identified data for 822 and the alignment data for 822 will include content similar to the record and alignment data for 820.

Alignment data for visual data, including visual data that is identified semantically, may further include a spatial location (e.g., x-pixels, y-pixels location in a video frame) in the video data where the identified data is found a shown in the above example. In another example, alignment data for an identified license plate may include the pixels of the one or more frames where the license plate appears. Any technique may be used to describe the pixels of the visual image of the license plate, such as bottom left top right corners of rectangle, one point with x and y distance, x and y points of the outline of the identified object.

Alignment data may optionally be merged into the record of the identified data.

During segment 810, identification circuit 420 for visual data identifies the following visual items:
  830: the stopped vehicle from an image of the vehicle.
  832: the license plate number of the vehicle as being MVH395 from an image of a license plate.

The record of identified data for identified data 830 may include:
  analysis type: visual;
  data type: vehicle;
  make: Ford;
  model: Taurus;
  color: Blue.

The record for 830 may optionally include a copy of the image of the vehicle from captured data 820.

The description of visual data may include the information show in Table 2 or other language that describes the data that has been visually identified.

The alignment data for identified data 830 may include:
  start time: 830S;
  end time: 830E;
  duration: 3 seconds;
  frame start: frame X+150;
  frame end: frame X+240;
  location: frame X_150: description of pixels that show the vehicle in frame X+150;
  location: frame X+151: description of pixels that show the vehicle in frame X+151;
  location: frame X+152: description of pixels that show the vehicle in frame X+152;
  and so forth as to the location in each frame.

During segment 810, identification circuit 430 for audio data identifies the following items:
  824: the incident type as "traffic stop" as spoken by the officer.
  826: the location as 5th Street and Elm Avenue as spoken by the officer.

Records of identified data have already been created for identified data 824 and 826 during the semantic analysis of captured data 800. The audio analysis may create another record for identified data 824 and 826 with the analysis type being audio. Multiple records of identified data may be created for the same identified data with each record being associated with a different type of analysis (e.g., semantic, visual, audio). Because different types of analysis may be performed in parallel on captured data 800, separate records may be created in parallel for the same identified data for the various types of analysis.

Records for the same identified data generated by different types of analysis may be merge or the records may remain as separate records. Whether the records of identified data or merged or kept separate, they may be searched by a computer while generating a report or preparing a copy of the captured data for release regardless of how they are stored.

The record of identified data for identified data 830 may include:
  analysis type: audio;
  value: traffic stop (via speech recognition);
  speaker: Officer Jones (if analyzed for identity);
  emotion: neutral.

This record for 824 may optionally include a copy of the audio snippet from captured data 820.

The description of visual data may include the information show in Table 3 or other language that describes the data that has been visually identified.

The alignment data for audio identified data 824 may include:
  start time: 830S;
  end time: 830E;
  duration: 1 second;
  frame start: frame X+90;
  frame end: frame X+120.

During segment 810, alert circuit 270 detects the following:

832: a license plate number was detected.

Detecting the license plate may trigger an alert so that the camera takes a high-resolution photo of the license plate. The camera may automatically take the high-resolution photo without user intervention or the alert circuit 270 may instruct the user via the user interface of the camera (e.g., capture system 110), hand-held computer 150 or in-vehicle computer 160, to position the camera so that the high-resolution photo of the license plate may be taken. Alert circuit 270 in cooperation with processing circuit 220 and/or communication circuit 210 may transmit the high-resolution photo to identification system 130 for analysis. In due course, identification system 130 may return the name of the registered owner to capture system 110 which sends it to in-vehicle computer 160 or hand-held computer 150 for display. The name of the registered owner of the vehicle may be stored in the description of the identified data.

During segment 812 of captured data 800, the officer approaches the vehicle, greets the driver, and the driver greets the officer back. The officer looks into the interior of the vehicle from the driver's side where a compound bow is visible on the back seat, and looks into the interior of the vehicle through the wind shield where the vehicle VIN is visible. The officer faces the driver again, asks the driver for their name and documents, and receives a driver's license, registration card, and proof of insurance. The officer instructs the driver to remain in the vehicle and returns to the cruiser. The officer then looks at the documents.

During segment 812, captured data 800 includes:

Between start time 850S and end time 850E: an image of the driver's face.

Between start time 852S and end time 852E: the officer greeting the driver.

Between start time 854S and end time 854E: the driver responding to the officer.

Between start time 856S and end time 856E: an image of the compound bow.

Between start time 858S and end time 858E: an image of the vehicle VIN.

Between start time 860S and end time 860E: an image of the driver's face.

Between start time 862S and end time 862E: the officer requesting documents and instructing the driver to remain in the vehicle.

Between start time 864S and end time 864E: an image of the driver's license.

Between start time 866S and end time 866E: an image of the registration.

Between start time 868S and end time 868E: an image of the insurance card.

During segment 812, identification circuit 410 for semantics identifies the following spoken or visual language related items:

At time 858: a vehicle VIN from the image of the VIN converted to ASCII characters.

At time 864: the driver's name from the image of the driver's license.

At time 864: the driver's home address from the image of the driver's license.

At time 864: the driver's age, sex, weight, and height from the image of the driver's license.

At time 866: a name from the image of the registration.

At time 866: an address from the image of the registration.

At time 866: vehicle make, model, year, license number, and VIN number from the image of the registration.

At time 868: a name from the image of the insurance card.

At time 868: an address from the image of the insurance card.

At time 868: a policy number from the image of the insurance card.

Identification circuit 410 creates and stores a record of identified data for each identified data shown above and alignment data for each identified data. The alignment data is associated with or merged with the record of identified data.

The description in the various records will include the information identified by identification circuit 410, such as VIN, name, home address, age, sex, weight, and so forth.

During segment 812, identification circuit 420 for visual data identifies the following visual items:

At time 850: a face from the image of the driver's face.

At time 856: a possible weapon from the image of the compound bow in the back seat.

At time 858: a vehicle VIN from the image of the VIN.

At time 860: a face from the image of the driver's face.

Identification circuit 420 creates and stores a record of identified data for each identified data shown above and alignment data for each identified data. The alignment data is associated with or merged with the record of identified data.

The description in the various records will include the information identified by identification circuit 420. For example, the record of identified data for 856 may include:

analysis type: visual;
data type: weapon;
weapon type: cross-bow;
threat level: low;
color: Blue;
manufacturer: unknown;
loaded: no.

The record for 856 may optionally include a copy of the image of the cross-bow from captured data 820.

Identification circuit 420 creates and stores a record of identified data for each identified data shown above and alignment data for each identified data. The alignment data is associated with or merged with the record of identified data.

During segment 812, identification circuit 430 for audio data identifies the following items:

At time 852: the greeting to the driver as spoken by the officer.

At time 854: the response to the officer as spoken by the driver.

At time 862: the request for documents and instruction to remain in the vehicle as spoken by the officer.

Identification circuit 430 creates and stores a record of identified data for each identified data shown above and alignment data for each identified data. The alignment data is associated with or merged with the record of identified data.

During segment 812, alert circuit 270 detects the following:

At time 850: an image of a face is detected.
At time 856: an image of a weapon is detected.
At time 858: a vehicle VIN is detected.
At time 860: an image of a face is detected.

Detecting a face triggers an alert so that the camera takes a high-resolution photo of the face either automatically or with user cooperation. Alert circuit 270 in cooperation with processing circuit 220 and/or communication circuit 210 may transmit the high-resolution photo of the face to identification system 130 for analysis. In due course, identification system 130 may return the identity of the person to capture system 110, in-vehicle computer 160, or hand-held computer 150 for display. The identity of the person may include any law enforcement information related to the person. The identity of the person and/or any law enforcement information may be stored in the description of the identified data or in the description of the alignment data for the identified data.

Detecting a weapon may trigger an alert, depending on the type of weapon. If an alert is triggered, alert circuit 270 may transmits a request for additional back up.

Detecting a VIN of a vehicle may trigger an alert to send the VIN to identification system 130 to identify the vehicle and owner associated with the VIN. Information regarding the VIN from identification system may include any outstanding law enforcement issues (e.g., stolen, parking tickets, not registered) related to the vehicle and/or owner. Information regarding the VIN may be sent to capture system 110. Information regarding the VIN may be stored in the description of identified data.

The types of analysis discussed above continues until the officer releases the vehicle and it drives away and the captured data ends.

Only some of the conditions or information provided in Tables 1-3 have been identified in the above example of captured data. All conditions and/or information of Tables 1-3 could have been detected and recorded as identified data with associated alignment data. Further other types of information and conditions not identified in Tables 1-3 may be identified and/or classified.

Only some of the alerts provided in Table 4 have been identified in the above example. All alerts and/or responsive actions could have been detected and taken. The alerts identified in Table 4 are not the only types of alerts that could be generated.

Alerts detected and the action taken may be stored in a log. The log of alert information may be sent to evidence management system 120 for storage and/or analysis for reporting.

An example of how records of identified data and alignment data may be used to redact information from captured data for providing a presentation of the captured information may also be discussed with respect to captured data 800 of FIG. 8.

While making a copy of captured data 800 or while presenting captured data 800, for example in a public forum, certain information may be redacted (e.g., removed, edited, obscured) from the presentation. The information in the records of identified data and alignment data may be used to remove portions of the captured data so that those portions are not presented or copied. The records of identified data and alignment data make it possible to redact captured data for presentation in real-time or near real-time. The information in the records of identified data and the alignment data reduces the computational load on the processor copying or presenting the captured data.

As redaction processor 660 begins to make a copy of or to present captured data 800, redaction processor 660 refers to the rules in rules memory 670 to determine the types of identified data that should be removed from the copy or presentation. Redaction processor 660 or processing circuit 620 copies or presents captured data 800 without modification until redaction processor 660 detects that information should be withheld from the copy or presentation.

Redaction processor 660 reads the alignment data for all of the records of identified data to note the locations in captured data 800 where identified data may need to be removed or altered. Analysis of where captured data 800 may need to be redacted may be performed much faster than captured data 800 can be presented, so all locations that may need to be modified may be identified within the first milliseconds of presenting captured data.

At each location (e.g., 820S, 822S, so forth) where captured data 800 may need to be redacted, redaction processor 660 accesses the record of identified data associated with the alignment data. Redaction processor extracts the description of the identified data from the record and compares the identified data to the rules stored in rules memory 670. The rules define (e.g., describe, identify) the type of information that should be removed from captured data 800 to generate the data that may be presented or copied. If redaction of the identified data is required or permitted by the rules, redaction processor 660 removes the identified data from the captured data and provides a redacted copy for presentation. Redaction processor 660 uses the information in the alignment data associated with the record of identified data to identify all of the locations in captured data 800 where the identified data must be removed or altered.

For identified data that has two or more records of identified data, the alternations may be done for each record at the same time or serially to properly redact the identified data. The modification of captured data 800 may occur much faster than captured data may be presented, so redaction processor 660 may prepare altered versions of captured data 800 well in advance of when it will need to be presented.

System 600 presents captured data 800 on a screen (e.g., monitor, TV) starting at time T0 and continuously presents captured data 800 without modification until the presentation reaches the first location (e.g., 820S) where captured data may need to be altered. If the rules required alteration, the alter data produced by redaction processor 660 is presented in place of captured data 800. If no alteration was required by the rules, system 600, for example, processing circuit 620, continues to present captured data 800 without alteration. At each location (e.g., 820S, 822S, so forth) in captured data 800 where redaction may be required processing circuit presents captured data 800 unaltered if redaction was not required by the rules or an amended version of captured data 800 prepared by redaction processor 660 if the rules mandated redaction.

For example, system 600 presents captured data on a screen (e.g., monitor, TV) starting at time T0 and continuously presents captured data 800 without modification until the presentation reaches start time 820S of identified data 820. Prior to or concurrent with reaching time 820S, redaction processor 660 accesses the description of identified data 820, analyzes the description in light of the rules from rules memory 670, and determines whether the identified data should or should not appear in the presentation.

In this case, assume that locations should be redacted from the presentation, so redaction processor 660 access the alignment data for identified data 820, removes or alters the identified data in all frames where the identified data appears, and provides the altered version to processing circuit 620 to present. Between the times 820S and 820E, processing circuit 620 presents the altered version of captured data 800 in the place of captured data 800. After reaching time 820E, processing circuit 620 again presents captured data 800 without alteration until the next decision point, 822S, is reached. At time 822S, the above process of determining whether the identified data should be redacted and if necessary providing a redacted version of captured data 800 is repeated.

As discussed above, the alignment data identifies the locations in captured data 800 where redactions may need to be made. The description of the identified data at each location is compared to the rules to determine if a redaction should be made. If a redaction is required, redaction processor 660 provides a redacted version of captured data 800. The redactions may include removing or altering an entire frame or only a portion (e.g., some pixels, specific pixels) of a frame.

Different rules may be applied for different intended uses, so redacting captured data 800 for different presentations requires the process to be repeated.

Identified data 820-868 in FIG. 8 do not overlap each other for clarity of presentation. In practice, the appearance of identified data in captured data may overlap each other in time and possibly in space. Redaction processor 660 may analyze many records of identified data for a particular frame of video and perform all required redactions while processing the frame or redaction processor 660 may process each record of identified data separately so that redactions to the same frame are performed serially.

In another example, redaction processor 660 accesses the alignment data associated with identified item 824 to determine that the identified data relates to a type of incident, which is this case is a traffic stop. In accordance with the rules of rules memory 650, redaction processor 660 is not required to redact the identification of a minor incident, so redaction processor 660 does not redact the audio portion of the captured data in which the officer says the words "traffic stop". In accordance with the rules of rules memory 670, redaction processor 660 is required to redact license plates, so redaction processor 660 uses the alignment data to identify each frame where the license plate appears so that the license plate information may be redacted. As discussed above, the entire frame may be redacted from the presentation or only the portion of each frame that shows the license plate. Pixels in a frame may be redacted by being blurred or by replacing the identified pixels with a specific image (e.g., solid color, word "redacted"). Redaction processor 660 alters the visual data being presented to redact (e.g., obscure) the license plate information in each applicable frame between time 824S and 824E.

At times 850 and 860, the captured data includes an image of a person. At times 864-866, the captured data includes personal information and addresses. The rules of rules memory 670 may specify that identifying information be redacted so the alignment data for each of the above would be used to redact the captured data from the presentation.

The rules for redaction may redact or not redact any type of data identified by identification processor 260/680/760 or identification circuit 400. The redaction of the semantic objects, visual objects, audio information, or other occurrence identified in Tables 1-3 or any other type of object or occurrence may be controlled by rules. Rules for redaction may be determined by the organization that owns or controls the captured data or by laws of a jurisdiction. The rules for redaction may vary by venue of presentation or proposed use of the captured data. The rules for redacting for public presentation (e.g., news) may be different from the rules for redacting for legal proceedings (e.g., trial).

A report processor may scan the descriptions of identified data to compile information for a report. A report processor may compile a list of identified data of all types or of selected types. The rules of rules memory 650 may specify the types of identified data that should be included or excluded from a report. A report processor may provide a list of identified semantic items, visual items, and/or audio items. A report processor may further provide the start time and/or end time of where each item is identified in the captured data. Information compiled by report processor 640 may be provided in a form for convenient inclusion in a report (e.g., police report).

For example, report processor 640 in accordance with the rules stored in rules memory 650 may scan the records of identified data 820-868 and the descriptions therein to produce a report of the type of incident (e.g., traffic stop), age of the person involved in the traffic stop, location of the stop, vehicle involved, and so forth. Report processor 640 may in accordance with the rules generate a list of all license plates identified in the captured data. Report processor 640 may operate in accordance with rules to identify and report any type of identified data and may report the time the identified data occurs in the captured data.

A report processor may analyze (e.g., scan) a period of time of captured data to provide a list of all identified data during the period of time. The report processor may cull the list of all items during the period of time in accordance with the rules stored in rules memory 650.

A report processor may scan the records of identified data from many capture systems. Captured data scanned by a report processor may be captured data from many capture systems that provide a different viewpoint of the same incident. A report processor may compare the identified data and/or descriptions of identified data from each capture system to find identified data of the same or different objects. A report processor may provide information for identifying the location (e.g., time) that the same object appears in one or more sets of captured data. A report processor may provide information to correlate the identified data from one set of captured data to the identified data from another set of captured data. Correlation data from a report processor may be use by a redaction processor to enhance the speed of redaction or the accuracy of redaction of the various sets of captured data.

Further embodiments are provided below.

A capture system for capturing and analyzing data, the capture system comprising: a sensor that detects physical properties and provides a signal in accordance with detecting; a capture processor that converts the signal to digital data; an identification processor; and a memory system; wherein, the identification processor: analyzes the digital data in accordance with one or more patterns; upon detecting one or more patterns in the digital data, determines a position of the identified data in the captured data; forms a description of the identified data in accordance with the one or more patterns; and stores in the memory system the position and the description as alignment data associated with the identified data.

The captures system of the above paragraph further comprising a communication circuit, wherein: the communication circuit transmits the captured data, the identified data, and the alignment data to an evidenced management computer.

A capture system for analyzing data, the capture system comprising: a sensor that provides captured data; an identification processor; and a memory system; wherein, the identification processor: analyzes the captured data in accordance with one or more patterns; upon detecting one or more patterns in the digital data, determines a position of the one or more patterns in the captured data; and stores the position in the memory system.

The captures system of above paragraph further comprising a communication circuit, wherein: the communication circuit transmits the captured data and the position to an evidenced management computer.

A capture system for analyzing data, the capture system comprising: a sensor that provides data captured data; an identification processor; and a memory system; wherein, the identification processor executes a stored program to: analyze the digital data in accordance with one or more patterns; detect one or more patterns in the digital data as identified data; determine a position of the identified data in the captured data as alignment data; form a description of the identified data in accordance with the one or more patterns; and store in the memory system the position and the description as alignment data associated with the identified data.

A method performed by a processing circuit for redacting captured data, the method comprising: comparing a description of previously identified data to one or more rules, the one or more rules stored in a memory system, the one or more rules provided by a person in an electronic format that is readable to the processing circuit; determining in accordance with comparing that the identified data qualifies for redaction; in accordance with an alignment data, accessing a portion of the captured data stored in a memory system, the alignment data associated with the identified data, the alignment data identifies a location of the identified data in the captured data; altering the captured data in the memory at the location indicated by the alignment data to redact the identified data from the captured data.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A method for presenting captured data, the captured data includes at least video data organized as frames, the method performed by a processor, the captured data, one or more records of identified data, and alignment data stored in a memory system, the method comprising:
   for a frame of the captured data:
      identifying, using the alignment data, each location in the frame where identified data may need to be removed, wherein the identified data comprises a portion of data in the frame;
      generating a description of the identified data, wherein the description comprises a description of semantic data, a description of audio data, and a description of visual data from the identified data;
      storing the description of the identified data in the one or more records of identified data;
      comparing the description of the identified data from the one or more records of identified data to one or more rules to determine whether the identified data should be removed from the frame, wherein the one or more rules are stored in the memory system, wherein the one or more rules comprise a semantic rule, a visual rule, and an audio rule, wherein the comparing the description comprises applying at least one of the one or more rules to the description of semantic data, the description of audio data, or the description of visual data, and wherein the one or more rules are applied based on an intended use of the captured data; and
      responsive to determining that the identified data should be removed from the frame, preparing a presentation copy of the frame, the presentation copy includes the captured data in which the identified data has been removed, otherwise, preparing the presentation copy of the frame so that the presentation copy includes the captured data without alteration; and
   presenting the presentation copy of the frame.

2. The method of claim 1 wherein identifying comprises identifying one or more pixels in the frame where the identified data is located.

3. The method of claim 1 wherein preparing the presentation copy in which the identified data has been removed comprises substituting each pixel of the identified data with a predetermined value.

4. The method of claim 1 wherein the steps of identifying, generating, comparing, and preparing are performed in advance of the presenting step.

5. The method of claim 4 further comprising storing the presentation copy of two or more frames while waiting to perform the step of presenting.

6. A system for presenting captured data, the system comprising:
   a capture system, the capture system includes a sensor for capturing at least one of video information and audio information and a memory system for storing the captured data;
   an identification system, the identification system includes at least one of a first identification circuit for identifying semantic data, a second identification circuit for identifying visual data, and a third identification circuit for identifying audio data; and
   a server, the server includes a processing circuit, and a rules memory; wherein:
      the capture system transmits the captured data to the identification system;
      the identification system:
         identifies semantic data, visual data, and audio data that appears in the captured data;

provides a description of each identified semantic data, visual data, and audio data;

generates alignment data that identifies the location of each identified semantic data, visual data, and audio data in the captured data; and transmits the description of each identified semantic data, visual data, and audio data, and the alignment data to the server; and the server:

compares the description of each identified semantic data, visual data, and audio data to rules, the rules comprising at least one of a semantic rule, a visual rule, and an audio rule, the rules specify which identified semantic data, visual data, or audio data should not be presented based on the at least one of the semantic rule, the visual rule, and the audio rule, the rules stored in the rules memory, and the rules applied based on an intended use of the captured data; and removes, in accordance with the comparison and the alignment data, zero or more of the identified semantic data, visual data, and audio data from the captured data prior to presenting the captured data.

7. The system of claim 6 wherein the identification system is part of the capture system.

8. The system of claim 6 wherein the capture system performs the functions of the identification system.

9. The system of claim 6 wherein the identification system is part of the server.

10. The system of claim 6 wherein the server performs the functions of the identification system.

11. The system of claim 6 wherein the alignment data comprises a start time of where the identified semantic data, visual data, and audio data first appears in the captured data.

12. The system of claim 6 wherein the alignment data comprises:

a start time of where the identified semantic data, visual data, and audio data first appears in the captured data; and a duration of how long the identified semantic data, visual data, and audio data appears in the captured data.

13. The system of claim 6 wherein the alignment data comprises an end time of where the identified semantic data, visual data, and audio data last appears in the captured data.

14. The system of claim 6 wherein the server removes the zero or more identified semantic data, visual data, and audio data in real-time as the presentation is displayed.

15. A capture system comprising:

a sensor configured to capture at least one of video data and audio data;

a memory system configured to store the captured at least one of video data and audio data; and a processing circuit configured to perform operations on the captured at least one of video data and audio data, the operations comprising:

analyzing the captured at least one of video data and audio data in accordance with one or more patterns to identify at least one of a semantic property, a visual property, and an audio property in the captured at least one of video data and audio data, wherein the one or more patterns are applied based on an intended use of the captured at least one of video data and audio data;

generating a description of the identified at least one of the semantic property, the visual property, and the audio property;

generating alignment data for the identified at least one of the semantic property, the visual property, and the audio property, wherein the alignment data includes at least one of a start time, an end time, and a duration of time to describe a location of the identified at least one of the semantic property, the visual property, and the audio property in the captured at least one of video data and audio data; and storing the description and the alignment data associated with the identified at least one of the semantic property, the visual property, and the audio property in the memory system.

16. The system of claim 15 wherein the alignment data further includes a description of the pixels of a frame of the captured at least one of video data and audio data where the identified at least one of the semantic property, the visual property, and the audio property appears.

17. The system of claim 15 further comprising an alert circuit wherein the alert circuit provides an alert responsive to identifying the at least one of the semantic property, the visual property, and the audio property.

18. The method of claim 1 wherein the semantic rule comprises determining whether the description of semantic data includes at least one of a particular word, personal information, incident police data, environmental information, vehicle information, an action word, an officer command, and geographic information.

19. The method of claim 1 wherein the visual rule comprises determining whether the description of visual data includes at least one of geographic data, a weapon, a person, a contraband, an animal, a medical visual, a vehicle, and an object movement.

20. The method of claim 1 wherein the audio rule comprises determining whether the description of audio data includes at least one of an environmental characteristic, a people-related characteristic, a voice identification, and a potential human emotion.

* * * * *